United States Patent [19]

Yamai

[11] Patent Number: 4,703,023

[45] Date of Patent: Oct. 27, 1987

[54] PROCESS FOR THE PRODUCTION OF LOW-THERMAL-EXPANSIVE $(ZRO)_2 P_2O_7$ CERAMIC

[75] Inventor: Iwao Yamai, Nagoya, Japan

[73] Assignee: Nihon Ceramics Co., Ltd., Toki, Japan

[21] Appl. No.: 843,077

[22] Filed: Mar. 24, 1986

[30] Foreign Application Priority Data

Mar. 22, 1985 [JP] Japan .................................. 60-59052

[51] Int. Cl.$^4$ .............................................. C04B 35/48
[52] U.S. Cl. ..................................... 501/102; 501/106
[58] Field of Search ............... 423/305, 306, 307, 308; 501/102, 106

[56] References Cited

U.S. PATENT DOCUMENTS

| | | | |
|---|---|---|---|
| 3,268,349 | 8/1966 | Brixner | 501/102 |
| 3,954,525 | 5/1976 | Myles et al. | 501/102 |
| 4,526,765 | 7/1985 | Ito et al. | 423/306 |
| 4,587,172 | 5/1986 | Roy et al. | 501/102 |

OTHER PUBLICATIONS

Yamai, I. et al., "Low-Thermal-Expansion Polycrystalline Zirconyl Phosphate Ceramic", J. Am. Cer. Soc., 68(5), pp. 273–278.
Ceramic Industry—Jan. 1983—p. 131, "Zirconal Phosphate".

Primary Examiner—Mark L. Bell
Attorney, Agent, or Firm—Robert E. Burns; Emmanual J. Lobato

[57] ABSTRACT

In the production of low-thermal-expansive zirconyl phosphate ceramic, whose chemical formula is $(ZrO)_2.P_2O_7$ and whose chemical composition is $2ZrO_2.P_2O_5$ by sintering of the fine-powder compact, three kinds of reaction aids are employed. They are a densifying aid, a grain-growth-suppressing aid and a solid-solution-forming aid. The densifying aid is always employed, the grain-growth-suppressing aid is employed for producing a more thermal-resistant ceramic for high temperature use and the solid-solution-forming aid is employed for producing a more low-thermal-expansive ceramic.

5 Claims, No Drawings

PROCESS FOR THE PRODUCTION OF LOW-THERMAL-EXPANSIVE $(ZRO)_2 P_2O_7$ CERAMIC

BACKGROUND OF THE INVENTION

This invention relates to a process for the production of high-strength and thermal-shock-resistant ceramic of phosphate, $[ZrO]_2.P_2O_7$ or $2ZrO_2.P_2O_5$.

In the $ZrO_2-P_2O_5$-system many compounds are known, i.e. zirconium phosphate $(ZrO_2).P_2O_7$ or $2ZrO_2.P_2O_5$), $NaZr_2P_3O_{12}$—type compounds, hydrated-compounds of this system and amorphous materials of this system. They have different chemical composition and different crystal structure. They are classified into two groups. The first two are used as low-thermal-expension ceramics, though the refractory temperature of $(ZrO)_2.P_2O_7$ is higher ($1700°$ C.) than that of $NaZr_2.P_3O_{12}$ ($1300°$ C.). The last two are used as catalyzer or special-function-ceramics.

It has hitherto been known that a ceramic of phosphate polycrystalline ceramic was low-thermal-expansive. However, its powder compact alone has not densified and it has not been known whether the low thermal expansion of the sintered ceramic was due to the crystal itself or due to microcracks in the ceramic like aluminum titanate.

The inventor has found that the powder compact of zirconyl phosphate was able to be densified when a metal oxide was used as densifying aid, the crystal has a low thermal-expansion-coefficient, $1.7 \times 10^{-6}/°C.$, and the transition grain size for microcracking was 7 $\mu m$ (J. Amer. Ceram. Soc., Vol. 68, No. 5, May 1985, pp 273-278).

Moreover, the inventor has found that a high-strength and thermal-resistant ceramic of zirconyl phosphate could be produced when he used a grain-growth-suppressing aid, and that the solid solution of zirconyl phosphate with niobium oxide had a lower thermal-expansion-coefficient, $0.3 \times 10^{-6}/°C.$ at 5 wt% niobium oxide, than the pure phase. The present invention is based on these findings.

SUMMARY OF THE INVENTION

It is an object of the present invention to produce a dense polycrystalline zircony phosphate ceramic.

It is another object of the invention to produce a more thermal-resistant zirconyl phosphate ceramic without microcracks.

It is a further object of the invention to produce a more low-thermal-expansive ceramic of the solid solution crystals.

These objects can be performed by a high temperature process always by using at least one densifying aid, moreover by using a grain-growth-suppressing aid and-/or a solid-solution-forming aid according to the purpose of the use.

DETAILED DESCRIPTION OF THE INVENTION

The feature of the present invention, therefore, consists of the production of a low-thermal-expansive zirconyl phosphate ceramic by sintering the powder compact with at least one densifying aid, moreover together with each one or both of a grain-suppressing aid and a solid-solution-forming aid.

In the process of the invention, the powder as a raw material is $\alpha$-phase of $(ZrO)_2.P_2O_7$, which irreversibly transforms from $\beta$-phase at above $1100°$ C. and which is the only thermodynamically stable phase up to $1700°$ C. above which decomposition occurs, so that the densifying temperature is preferably above $1200°$ C. and below $1700°$ C. Also, it is preferable that the powder is prepared by precipitation from an aqueous solution or have finer grain size than 1 $\mu m$.

In the process of the present invention, the densification of the powder compact is performed under the presence of a liquid phase, which is melted metal-orthophosphate formed by the reaction of zirconyl phosphate with a densifying aid, which is a metal oxide. So that the effect of the metal oxide on densification appears near the melting temperature of the metal-phosphate. The effective oxide on the densification is ZnO, MgO, $Bi_2O_3$, $MnO_2$, $Co_2O_3$, NiO, $TiO_2$, $CeO_2$, $Nb_2O_5$; these oxides are effective above 0.2 wt%, preferably effective between 1.0-3.0 wt% except up to 10% of $Ta_2O_5$ and the property of the ceramic becomes bad over 10wt%.

The maximum thermal-expansion anisotropy of $\alpha$-zirconyl phosphate crystal is $11.4 \times 10^{-6}/°C.$ of the expansion difference between the b-axis and the c-axis in the crystal. According to the anisotropy, large stress generates in the large-grain ceramic in the cooling period after firing the ceramic, then microcracks form at the grain boundary and/or in the grain, and the microcracks deteriorate the strength of the ceramic. The microcracks do not form below a certain grain size, so that a transition grain size for microcracking exists, that is 7 $\mu m$ for the zirconyl phosphate.

In the process of the present invention, therefore, a microcrack-free ceramic, which is high-strength and thermal-resistant, is produced by suppressing the grain growth below the 7 $\mu m$ with a metal oxide, among which $SiO_2$ was the most effective. The grain-growth-suppressing aid or its reaction product with zirconyl phosphate, e.g. $ZrSiO_4$, deposits in grain boundary and then the grains are not able to contact each other and to grow.

In the process of the present invention, a more low-thermal-expansive ceramic is produced by sintering the powder compact of the solid solution of $[ZrO]_2.P_2O_7$ crystal with niobium oxide. The solid solution is prepared by firing a mixture of the both powders above $1200°$ C. and below $1400°$ C. above which the crystals grow abnormally.

The present invention will be further illustrated in detail in following Examples. It will be evident to those skilled in the art that the ratios, ingredients in the following formulations and the order of operations can be modified within the scope of the present invention. Therefore, the present invention is not to be interpreted as being limited by the following Examples.

EXAMPLE 1

The $\alpha$-$[ZrO]_2.P_2O_7$ fine powder, perferably below 3 $\mu m$, was mixed with 1 wt% of fine MgO powder and 2 wt% of fine $SiO_2$ powder. The resultant powder was in the shape of bar, $1.5 \times 5 \times 0.15$ cm, then the bar was sintered at $1400°$ C. for 24 hr. The resultant polycrystalline ceramic had 1650 kg/cm$^2$ of bending strength and $2.0 \times 10^{-6}/°C.$ of thermal-expansion-coefficient ($0°$ C.–$1000°$ C.), and 3.0 $\mu m$ of the average grain size.

EXAMPLE 2-25

The procedure of Example 1 was repeated but various compositions of raw materials, reaction conditions as shown in Table 1 and 2 and there were thus obtained various properties of $\alpha\text{-}[Zr.O]_2.P_2O_7$ ceramics.

TABLE 1

| Example No. | Composition of Raw Materials (wt %) | | | |
|---|---|---|---|---|
| | zirconyl phosphate | densifying aid | | grain-growth-suppressing aid |
| 2 | 98.0 | ZnO | 2.0 | 0 |
| 3 | 98.0 | MgO | 2.0 | 0 |
| 4 | 98.0 | MgO | 2.0 | 0 |
| 5 | 99.6 | ZnO | 0.2 | $SiO_2$ 0.2 |
| 6 | 99.0 | MgO | 0.5 | $SiO_2$ 0.5 |
| 7 | 97.0 | MgO | 1.0 | $SiO_2$ 2.0 |
| 8 | 90.0 | MgO | 7.0 | $SiO_2$ 3.0 |
| 9 | 94.0 | MgO | 2.0 | $ZrSiO_4$ 4.0 |
| 10 | 95.0 | MgO | 1.0 | $3MgO.4SiO_2.H_2O$ (Talc) 4.0 |
| 11 | 97.0 | ZnO | 1.0 | $SiO_2$ 2.0 |
| 12 | 95.0 | $Bi_2O_3$ | 2.0 | $SiO_2$ 3.0 |
| 13 | 93.0 | $MnO_2$ | 5.0 | $SiO_2$ 2.0 |
| 14 | 92.0 | $Fe_2O_3$ | 3.0 | $CaMgSiO_4$ 5.0 |
| 15 | 93.0 | $Co_2O_3$ | 3.0 | $Fe_2SiO_4$ 4.0 |
| 16 | 96.0 | NiO | 2.0 | $SiO_2$ 2.0 |
| 17 | 96.0 | $TiO_2$ | 2.0 | $SiO_2$ 2.0 |
| 18 | 93.0 | $CeO_2$ | 3.0 | $ZnSiO_4$ 4.0 |
| 19 | 94.0 | MgO $CeO_2$ | 1.0 2.0 | $SiO_2$ 3.0 |
| 20 | 93.0 | $Ta_2O_5$ | 5.0 | $SiO_2$ 2.0 |
| 21 | 90.0 | $Ta_2O_5$ | 7.0 | $SiO_2$ 3.0 |
| 22 | 95.0 | $Nb_2O_5$* | 3.0 | $SiO_2$ 2.0 |
| 23 | 93.0 | $Nb_2O_5$* | 6.0 | $SiO_2$ 2.0 |
| 24 | 90.0 | $Nb_2O_5$* | 7.0 | $SiO_2$ 3.0 |
| 25 | 92.0 | $Nb_2O_5$* | 5.0 | $ZrSiO_4$ 3.0 |

*densifying aid and/or solid-solution-forming aid

TABLE 2

| Example No. | Reaction Condition and Properties of Products | | | |
|---|---|---|---|---|
| | Firing & Annealing Conditions (°C.)-(hr) | Average Grain Size (μm) | Bending Strength (kg/cm²) | Thermal Expansion Coefficient* ($\times 10^{-6}$/°C.) |
| 2 | 1400°-4 | 130 | 190 | −0.5 |
| 3 | 1300°-5 | 3.0 | 1850 | 1.9 |
| 4 | 1300°-5 & 1300°-6 | 15 | 510 | 1.0 |
| 5 | 1400°-2 | 6.0 | 1200 | 1.9 |
| 6 | 1400°-10 | 6.0 | 1150 | 2.0 |
| 7 | 1600°-2 | 6.0 | 1100 | 2.0 |
| 8 | 1500°-3 | 5.5 | 1450 | 2.4 |
| 9 | 1400°-5 & 1400°-16 | 3.5 | 1650 | 2.1 |
| 10 | 1400°-24 | 3.5 | 1750 | 2.1 |
| 11 | 1500°-4 | 4.5 | 1550 | 2.3 |
| 12 | 1400°-4 | 4.0 | 1300 | 2.2 |
| 13 | 1400°-1 & 1300°-16 | 3.0 | 1650 | 2.4 |
| 14 | 1300°-4 | 3.5 | 1450 | 2.4 |
| 15 | 1300°-4 | 3.0 | 1850 | 2.3 |
| 16 | 1400°-4 | 3.5 | 1350 | 2.2 |
| 17 | 1600°-4 | 5.0 | 1150 | 2.3 |
| 18 | 1600°-4 | 4.5 | 1250 | 2.3 |
| 19 | 1500°-6 | 4.0 | 1750 | 2.2 |
| 20 | 1700°-2 | 6.0 | 970 | 2.3 |
| 21 | 1600°-5 & 1600°-4 | 4.0 | 1600 | 2.5 |
| 22 | 1400°-5 | 4.0 | 1650 | 1.7 |
| 23 | 1400°-5 & 1400°-10 | 3.5 | 1750 | 0.6 |
| 24 | 1500°-4 | 4.0 | 1550 | 0.9 |
| 25 | 1600°-2 | 5.5 | 1350 | 0.8 |

*0°–1000° C.

What is claimed is:

1. A process for the production of low-thermal-expansive $(ZrO)_2.P_2O_7$ polycrystalline ceramic which comprises sintering the fine-powder compact of $(ZrO)_2.P_2O_7$ crystal with a densifying aid selected from the group consisting of zinc oxide, magnesium oxide, bismuth oxide, manganese oxide, iron oxide, cobalt oxide, nickel oxide, the compounds of said metal oxides and mixtures thereof together with a grain-growth-suppressing aid selected from the group of consisting silicon dioxide, metal silicate and mixtures thereof at a temperature from 1200° C. to 1700° C. wherein the content of the densifying aid is from 0.2% to 10.0% by weight and the content of the grain-growth-suppressing aid is from 0 to 10% by weight.

2. A process according to claim 1, wherein the densifying aid is the powder of said metal oxides and the powder of the compounds of said metal oxides selected from the group consisting of the phosphates, the carbonate, the sulfates, the nitrates and mixtures thereof.

3. A process according to claim 1, wherein the grain-growth-suppressing aid is the powder of silicon dioxide and the powder of the silicate of metal selected from the group consisting of zinc, magnesium, manganese, cobalt, iron, aluminum and mixtures thereof.

4. A process according to claim 1, wherein the $(ZrO)_2.P_2O_7$ crystal is in solid solution with up to 5% by weight of niobium oxide, said solution being produced by the reaction of $(ZrO)_2.P_2O_7$ powder with niobium oxide powder at a temperature from 1200° C. to 1400° C.

5. A process according to claim 1, wherein $(ZrO)_2.P_2O_7$ powder is prepared by precipitation from an aqueous solution.

* * * * *